United States Patent [19]
Chao

[11] Patent Number: 5,870,800
[45] Date of Patent: Feb. 16, 1999

[54] STEERING WHEEL ROTATING AID

[76] Inventor: Hua-Jen Chao, No. 580-16, San Min Road, Lu Chou Shiang Taipei Hsien, Taiwan

[21] Appl. No.: 651,259

[22] Filed: May 23, 1996

[51] Int. Cl.[6] ....................................................... E05B 1/00
[52] U.S. Cl. ............................................. 16/114 R; 16/121
[58] Field of Search ............................ 16/114 R, 110 R, 16/121, DIG. 40, DIG. 41; 74/494; 294/58, 59, 54.5

[56] References Cited

U.S. PATENT DOCUMENTS

| | | | |
|---|---|---|---|
| 3,249,990 | 5/1966 | Schlage | 16/121 |
| 3,341,235 | 9/1967 | Mattson et al. | 16/114 R |
| 4,225,104 | 9/1980 | Larson | 16/114 R |
| 4,881,294 | 11/1989 | Riedl | 16/DIG. 40 |

*Primary Examiner*—Chuck Mah
*Attorney, Agent, or Firm*—Bacon & Thomas

[57] ABSTRACT

A rotatable steering wheel aid is secured to the wheel by a segmented annular holder which embraces the wheel and to which a rotatable head member is attached by a threaded fastener and bearing assembly.

4 Claims, 6 Drawing Sheets

STEERING WHEEL ROTATING AID

BACKGROUND OF THE INVENTION

Presently, there are many differently designed steering wheel rotating aids available in the market. These steering wheel rotating aids are, however, complicated in structure and can not be easily mounted onto the steering wheel. In some cases, the mounted rotating aid radially projects from the steering wheel to a considerable extent, as shown in FIG. 6, which will not only hinders the driver from smooth handling of the steering wheel, but also makes the steering wheel look unsightly. The complicated structure and the difficulty in mounting further causes higher manufacturing cost. It is therefore an object by the inventor to develop a steering wheel rotating aid which eliminates the drawbacks of the conventional steering wheel rotating aids.

SUMMARY OF THE INVENTION

The present invention relates to a steering wheel rotating aid which has a simple structure, integral appearance, and has parts that all can be produced in a manner of mass production to reduce manufacturing cost. In addition, the steering wheel rotating aid can be easily mounted onto or dismounted from the steering wheel while the mounted aid does not form any sharp edge projected from the periphery of the steering wheel. Accordingly, the present invention can be more comfortably handled by the driver.

The present invention relates more particularly to a means which is mounted onto a steering wheel of an automobile to facilitate the rotating of the steering wheel by the driver.

The steering wheel rotating aid of the present invention mainly includes an annular holder, a head member with a bearing received thereinside, and interconnecting member connecting the annular holder and the head member together. The annular holder is provided with sunk screw holes so that it can be easily locked onto a steering wheel without forming any projection and unsightly edges and thereby facilitates gripping of the steering wheel with only one hand.

DETAILED DESCRIPTION OF THE PREFERRED EMBODIMENT

Figure 1:
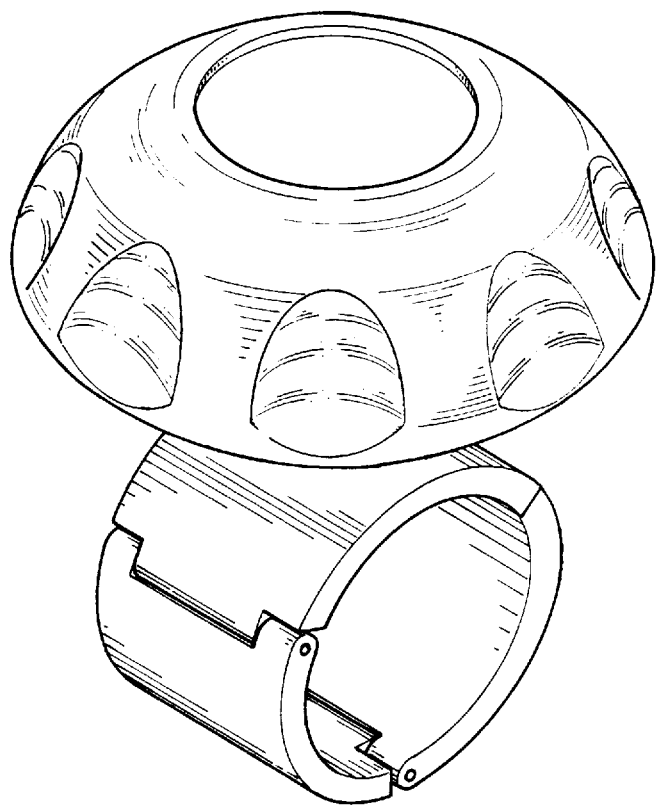
FIG. 1 is an assembled perspective view of the present invention.
Figure 2:
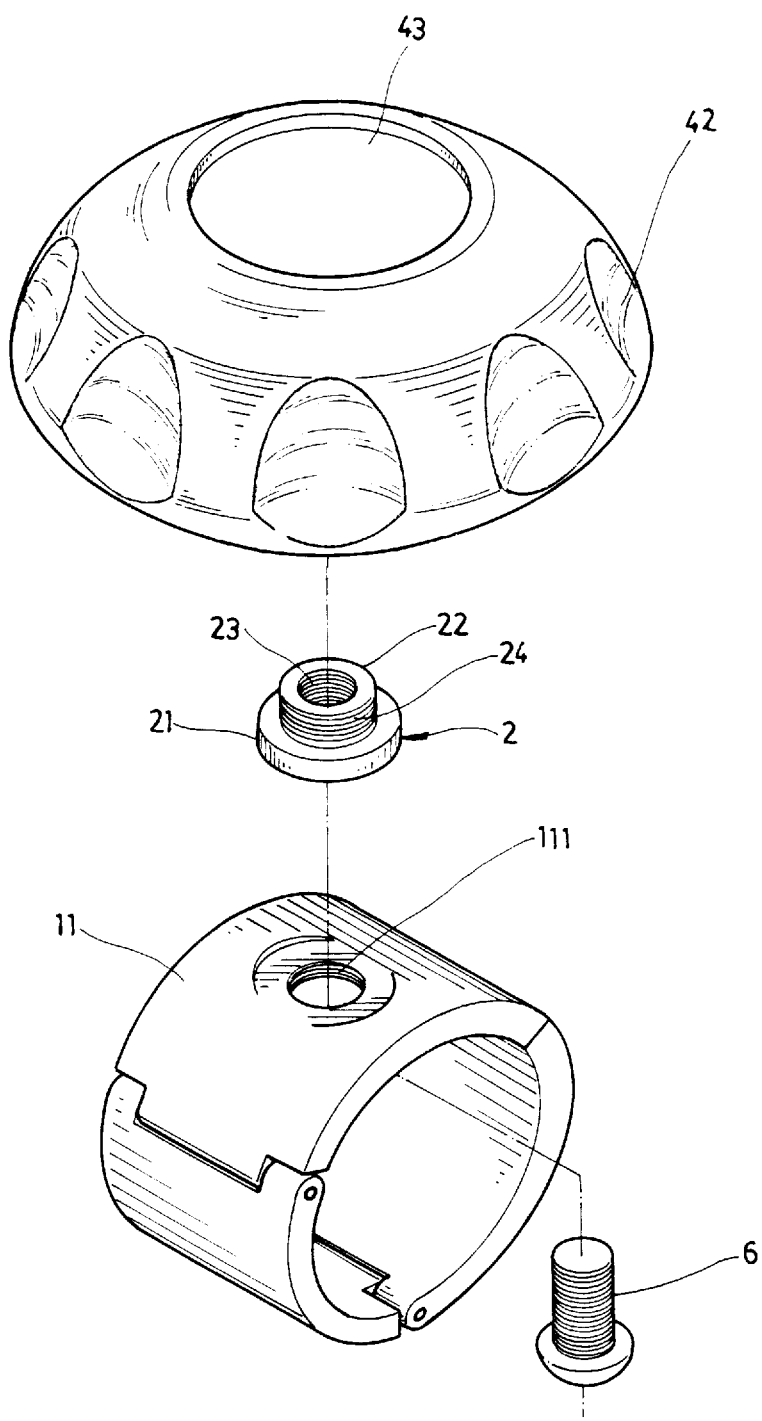
FIG. 2 is an exploded perspective view of the present invention.
Figure 3:
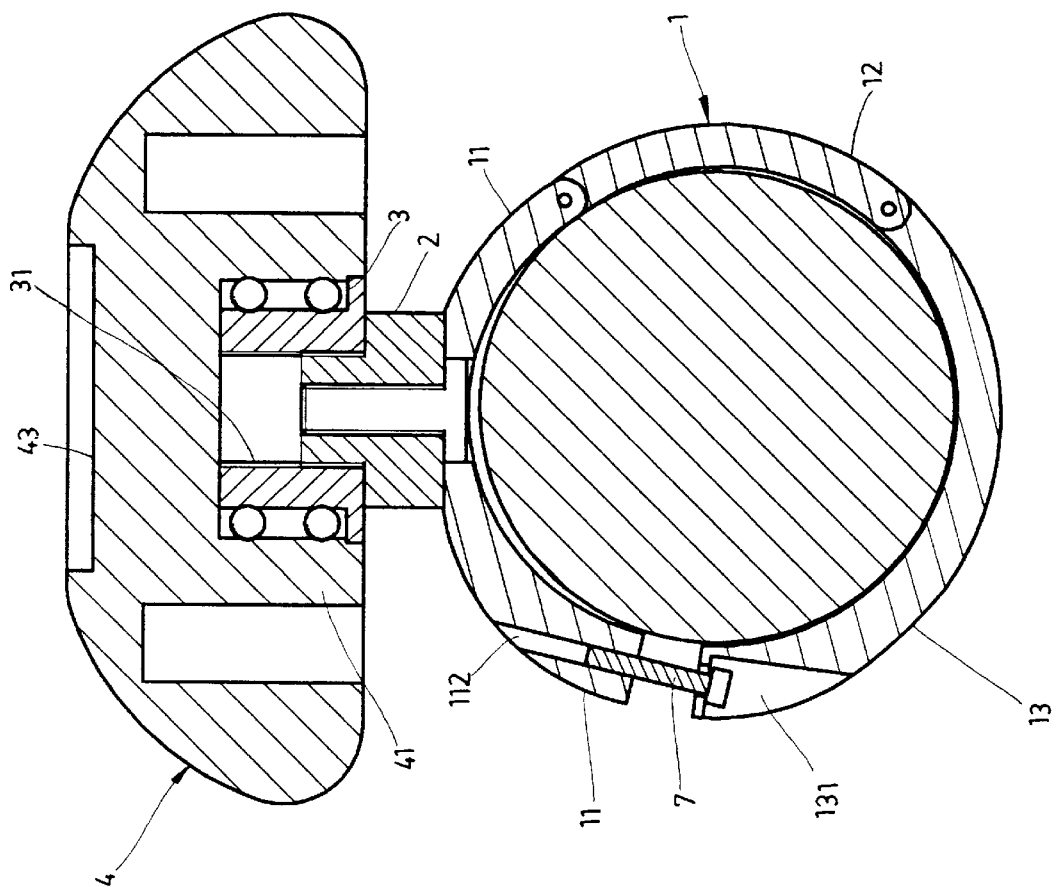
FIG. 3 is a sectional view of the present invention before the annular holder thereof is tightly fastened to a wheel.
Figure 4:
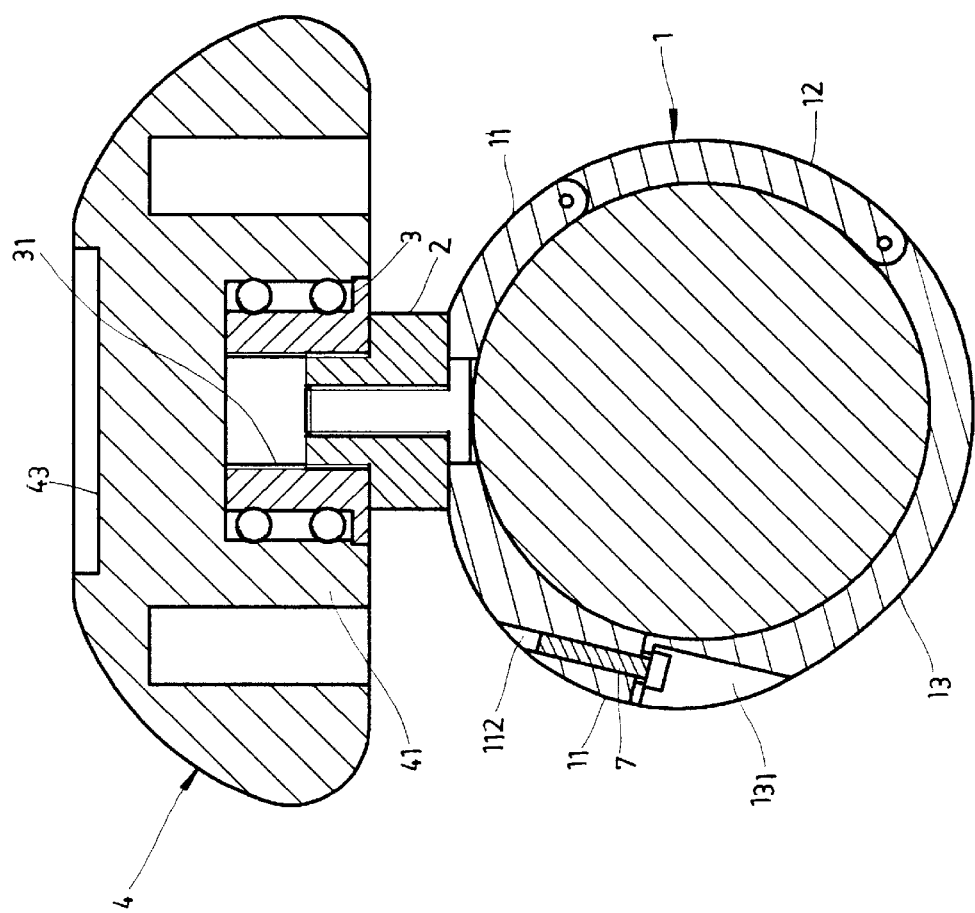
FIG. 4 is similar to FIG. 3 but with the annular holder of the present invention tightly fastened to a wheel.

Please refer to FIGS. 1 through 4. The present invention relates to a steering wheel rotating aid which mainly includes an annular holder 1, an interconnecting member 2, a bearing 3, and a head member 4. The annular holder 1 consists of multiple segments (three are shown in the drawing) 11, 12, 13 sequentially and pivotally connected together to form a circular collar-like member. The annular holder 1 has an internal diameter corresponding to a sectional diameter of a grip portion of a steering wheel 5. An end segment 11 has a centered and internally threaded hole 111 for a screw 6 to thread therethrough. One end of the segment 11 is pivotally connected by rivets, for example, to an end of the middle segment 12. The middle segment 12 is similarly pivotally connected at another end to an end of the other end segment 13. A free end of the segment 13 is formed with a countersunk screw hole 131 while a free end of the segment 11 is correspondingly formed with a threaded hole 112. The free ends of segments 11, 13 together form a size-adjustable opening which can be closed by threading a screw 7 from the countersunk screw hole 131 into the threaded hole 112, whereby the segments 11, 13 are tightened together to form a circular collar-like member.

The interconnecting member 2 includes a base 21 and a projected shaft portion 22. The shaft portion 22 has an external diameter close to an internal diameter of the bearing 3. An internally threaded through hole 23 is centered in the base 21 and the shaft portion 22 for the screw 6 to thread through from the threaded hole 111 on the segment 11 of the annular holder 1, so that the annular holder 1 is firmly connected to the interconnecting member 2. External threads 24 are also provided around an outer side wall of the shaft portion 22.

The head member 4 is of a size slightly smaller than the palm of a user and has a smooth and generally spherical top surface with a plurality of arcuate recesses disposed along a periphery of the top surface so that the head member 4 is suitable for gripping by a hand. A small, shallow, arcuate recess 43 is centered on the top surface of the head member 4 for a trademark or other mark to attach thereto. The head member 4 is formed at a bottom side with a shaft body 41. A bore is formed inside the shaft body 41 to receive the bearing 3 therein.

The bearing 3 is received in the shaft body 41 of the head member 4 in a tight fit relation so that the bearing 3 is brought by the head member 4 to rotate freely and smoothly. The bearing 3 is provided at an inner side wall with threads 31 which engage with the threads 24 of the interconnecting member 2 so that the annular holder 1 is connected to the head member 4 by means of the interconnecting member 2.

Figure 5:
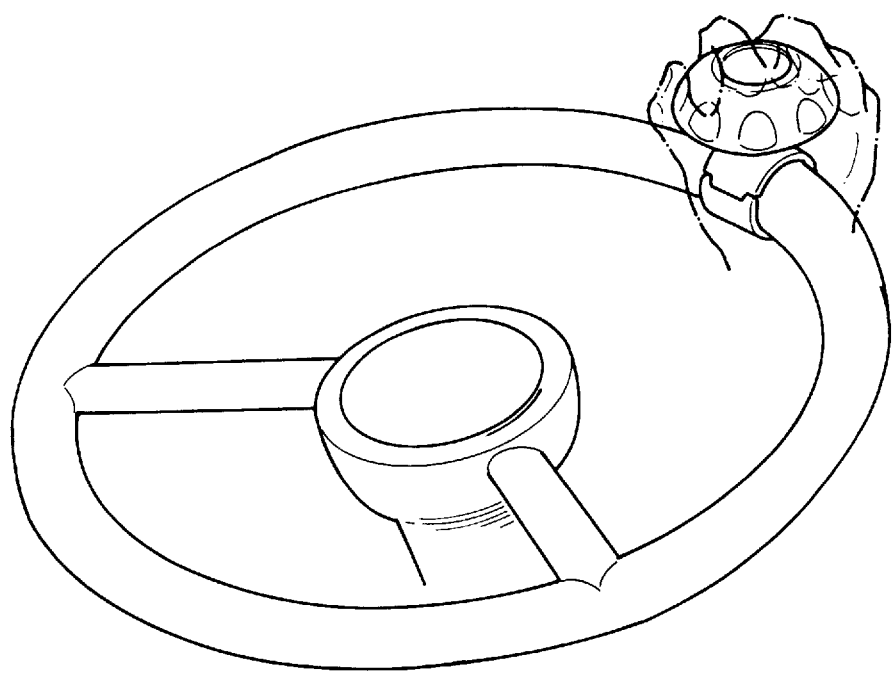
FIG. 5 illustrates the manner in which the present invention is mounted on a steering wheel and be used by a driver.
Figure 6:
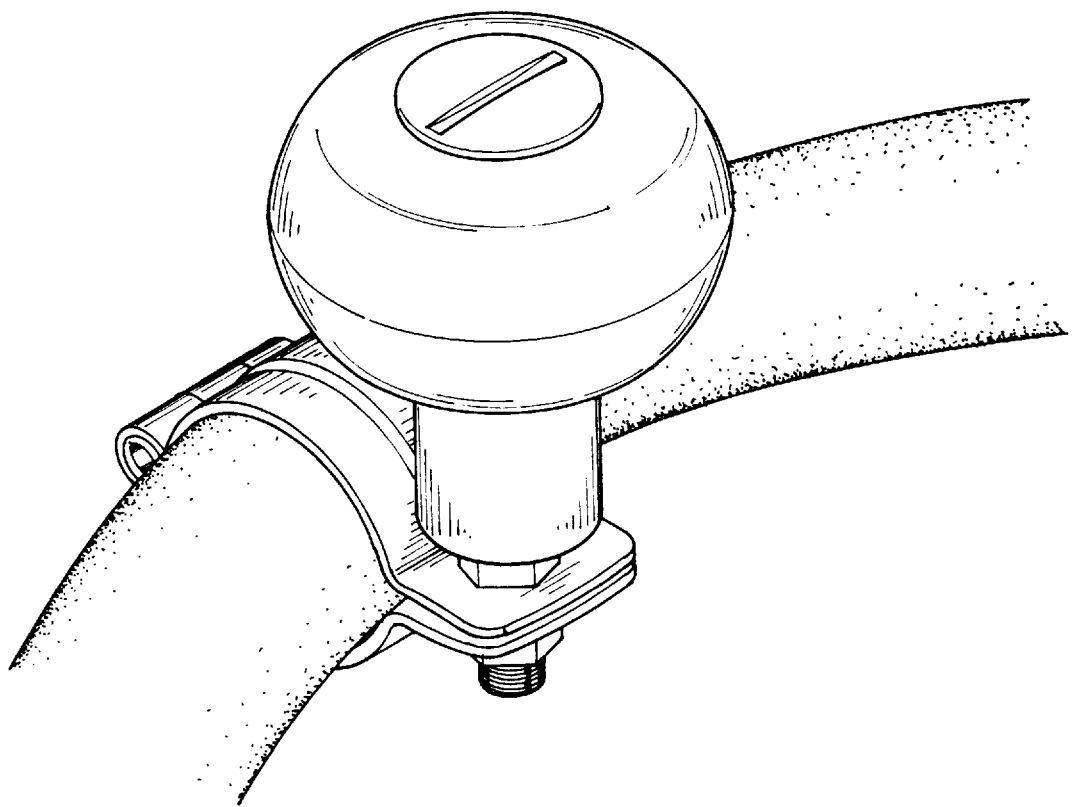
FIG. 6 illustrates the manner in which a conventional steering wheel rotating aid is mounted on a steering wheel.

Please now refer to FIG. 5 while referring to FIGS. 1 to 4 at the same time. After the head member 4 and the bearing 3 are connected to the annular holder 1 via the member 2, a user needs only to put the annular holder 1 around the grip portion of the steering wheel 5 while the adjustable opening between the segments 11, 13 is still open. Then, tighten the screw 7 to fasten the segments 11, 13 together so that the annular holder 1 embrace and attach to the steering wheel 5. To detach the annular holder 1 from the steering wheel 5, simply loosen the screw 7 and remove the annular holder 1 from the steering wheel 5. With the countersunk screw hole 131 and the threaded hole 112, the mounted steering wheel rotating aid of the present invention provides the steering wheel 5 with an integral and smooth appearance without forming any projections and sharp edges.

What is claimed is:

1. A steering wheel rotating aid comprising:

a) an annular holder formed from a plurality of segments, the segments being sequentially and pivotally connected together to form a circular collar-shaped member having an internal diameter corresponding to a sectional diameter of a steering wheel grip portion, a first of the segments being provided with a first threaded hole formed therethrough;

b) a head member having a substantially spherical-shaped top surface, a periphery of the top surface having a plurality of arcuate recesses formed therein, and a centered arcuate recess formed in the top surface;

c) a bearing tightly fitted within the head member for permitting free rotation of the head member; and d) an interconnecting member including a base and a shaft portion projecting upwardly from the base for connecting the annular holder to the bearing, the member having an internally threaded hole extending through the base and the shaft portion, and a first screw threadedly engaged through the first threaded hole of the first segment and the internally threaded hole of the member.

2. The steering wheel rotating aid of claim 1 wherein:

a) the first segment has a first end and a free end, the first end being pivotally connected to a second segment, the second segment being pivotally connected to a final segment having a free end, the free ends of the first and final segments forming an opening therebetween;

b) a second threaded hole formed in the free end of the first segment, a countersunk hole formed in the free end of the final segment; and c) a second screw extending through the countersunk hole and threadedly engaged within the second threaded hole for closing the opening and tightening the annular holder around the steering wheel grip portion.

3. A steering wheel rotating aid comprising:

a) an annular holder formed from a plurality of segments sequentially and pivotally connected together to form a circular collar-shaped member having an internal diameter corresponding to a sectional diameter of a steering wheel grip portion;

b) a head member having a substantially spherical-shaped top surface, a periphery of the top surface having a plurality of arcuate recesses formed therein, and a centered arcuate recess formed in the top surface;

c) a bearing tightly fitted within the head member for permitting free rotation of the head member; and d) an interconnecting member having a base and a shaft portion projecting upwardly from the base for connecting the annular holder to the bearing, the shaft portion having a threaded outer side wall, the bearing having a threaded inner side wall, and the threaded outer side wall being engaged within the threaded inner side wall.

4. A steering wheel rotating aid comprising:

a) an annular holder formed from a plurality of segments sequentially and pivotally connected together to form a circular collar-shaped member having an internal diameter corresponding to a sectional diameter of a steering wheel grip portion;

b) a head member having a substantially spherical-shaped top surface, a periphery of the top surface having a plurality of arcuate recesses formed therein, a centered arcuate recess formed in the top surface, a shaft body extending downwardly from a bottom side of the top surface, an axially extending central bore formed in the shaft body;

c) a bearing tightly fitted within the central bore of the shaft body for permitting free rotation of the head member; and d) an interconnecting member having a base and a shaft portion projecting upwardly from the base for connecting the annular holder to the bearing.

* * * * *